(12) United States Patent
Lin et al.

(10) Patent No.: US 7,047,543 B2
(45) Date of Patent: May 16, 2006

(54) OPTICAL DISK CLAMPING DEVICE

(75) Inventors: Tung-Lung Lin, Banchiau (TW); Chih-Tsung Liu, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 233 days.

(21) Appl. No.: 10/730,673

(22) Filed: Dec. 8, 2003

(65) Prior Publication Data

US 2004/0139456 A1 Jul. 15, 2004

(30) Foreign Application Priority Data

Jan. 10, 2003 (TW) .............................. 92100490 A

(51) Int. Cl.
*G11B 25/04* (2006.01)
(52) U.S. Cl. .................................................... 720/710
(58) Field of Classification Search ................ 720/604, 720/706–711; 360/98.08
See application file for complete search history.

(56) References Cited

U.S. PATENT DOCUMENTS

| 4,477,894 | A | * | 10/1984 | Clurman | ...................... 720/710 |
| 6,246,654 | B1 | * | 6/2001 | Omori et al. | ................ 720/604 |
| 2002/0191531 | A1 | * | 12/2002 | Yeh et al. | .................... 369/270 |
| 2003/0107983 | A1 | * | 6/2003 | Kim et al. | ................... 369/270 |

* cited by examiner

*Primary Examiner*—William Klimowicz
*Assistant Examiner*—Mark Blouin
(74) *Attorney, Agent, or Firm*—Quintero Law Office

(57) ABSTRACT

An optical disk clamping device. The device includes a diamagnetic member, a turntable, a magnet, and a clamping member. The turntable supports an optical disk. The magnet is disposed between the diamagnetic member and the turntable. The clamping member is disposed on the turntable to support the magnet. A repellent force is generated between the diamagnetic member and the magnet when the turntable rotates, pushing the magnet toward the clamping member to fix the optical disk.

22 Claims, 5 Drawing Sheets

OPTICAL DISK CLAMPING DEVICE

BACKGROUND OF THE INVENTION

1. Field of the Invention

The present invention relates to an optical disk clamping device. In particular, the present invention relates to an optical disk clamping device in which an optical disk can be easily loaded and unloaded.

2. Description of the Prior Art

Currently, the optical disk clamping devices of the optical disk drives used in desktop computers are magnets which attract or repel a disk from the turntable. As the size of electronic devices is continuously reduced, the mentioned clamping device is unsuitable, especially for thin type optical disk drives. Thus, another rotatable locking hub with a plurality of retractable retaining prongs is required for DVD players or thin type optical disk drives.

In practice, using the above mentioned devices, it is difficult to load or unload the disk, and can cause deformation or damage to the disk. Incorrect application of force on the disk may further damage the motor of the optical disk drive. Moreover, current DVDs have a dual layer structure, and during loading and unloading of the disk, the layers may separate due to the clamping and retracting force of the clamping device.

SUMMARY OF THE INVENTION

An object of the present invention is to provide an optical disk clamping device that solves the above mentioned problem. The optical disk clamping device has a repellent force generated between a diamagnetic member and a magnet when the clamping device rotates so that the repellent force pushes a clamping member to fix an optical disk. The repelling force ceases when the clamping device stops rotating such that the clamping force applied to the optical disk is reduced. Thus, it is easy to load and unload the disk, and damage to the optical disk drive or disk is prevented.

The principles of the present invention are electromagnetic induction and the interaction between a diamagnetic member and a magnet. No apparent activity is detected when the diamagnetic member and the magnet are static, but a repellent force is generated when the diamagnetic member and the magnet move or rotate relative to one another. The repellent force is due to the Faraday's Law, Lenz's Law, and the diamagnetism of the diamagnetic member. For example, the magnet is an anisotropic magnet with a high energy product having large coercivity and large magnetization, additionally the diamagnetic member is aluminum.

Due to the structure of the present invention the repellent force is only applied in the axial direction, thus the force neither affects the rotating speed nor the power of the motor. Further, the present invention improves the stability of the motor and the clamping device of the optical disk drive.

The present invention provides an optical disk clamping device. The clamping device includes a diamagnetic member, a turntable, a magnet, and a clamping member. The turntable supports an optical disk. The magnet is disposed between the diamagnetic member and the turntable. The clamping member is disposed on the turntable to support the magnet. A repellent force is generated between the diamagnetic member and the magnet when the turntable rotates, pushing the magnet toward the clamping member to fix the optical disk.

The present invention also provides one another optical disk clamping device, comprising a magnet, a turntable, a diamagnetic member, and a clamping member. The turntable supports an optical disk. The diamagnetic member is disposed between the magnet and the turntable. The clamping member is disposed on the turntable to support the diamagnetic member. A repellent force is generated between the diamagnetic member and the magnet when the turntable rotates, pushing the diamagnetic member toward the clamping member to fix the optical disk.

DESCRIPTION OF THE DRAWINGS

The present invention can be more fully understood by reading the subsequent detailed description in conjunction with the examples and references made to the accompanying drawings, wherein:

FIGS. 1c and 1d are cross sections along IC–IC' line of FIG. 1a;

FIGS. 2b and 2c are cross sections along line IIB–IIB' of FIG. 2a.

DETAILED DESCRIPTION OF THE INVENTION

Figure 1A:
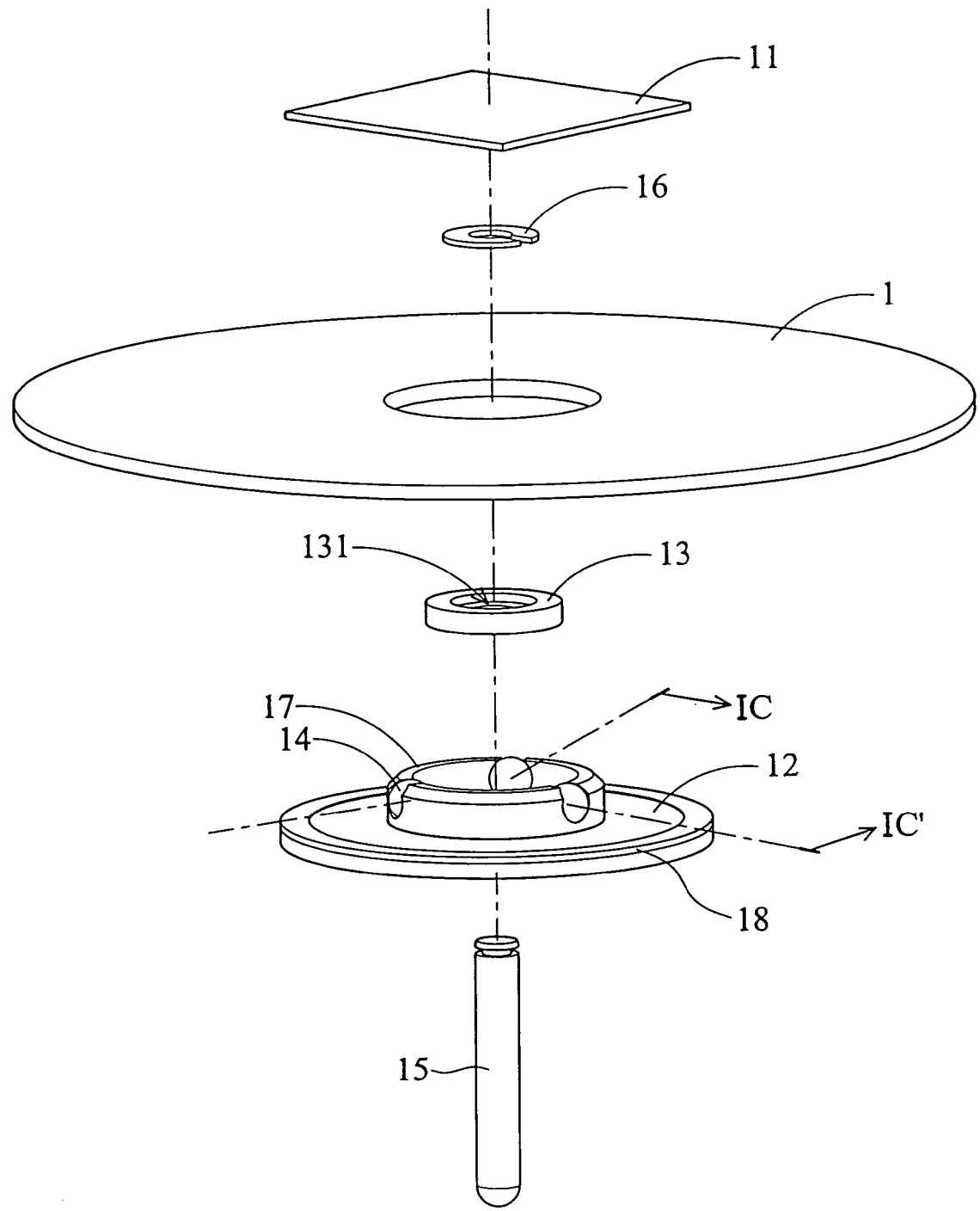
FIG. 1a is a schematic diagram of an optical disk clamping device in accordance with the present invention.

FIGS. 1a, 1b, 1c, and 1d show an optical disk clamping device including a diamagnetic member 11, a turntable 12, a magnet 13, a clamping member 14, a shaft 15, and a retaining washer 16. In the embodiment, the diamagnetic member 11 is an aluminum member, for example, the diamagnetic member 11 is an aluminum cover of an optical disk drive, and the clamping member 14 is a steel ball. The turntable 12 is disposed in the optical disk drive, and the shaft 15 is fastened to the turntable 12. The shaft 15 is rotated by a motor in the optical disk drive such that the turntable 12 rotates with the shaft 15.

The turntable 12 supports an optical disk 1. The magnet 13 is disposed between the diamagnetic member 11 and the turntable 12. The clamping member 14 is disposed on the turntable 12 to support the magnet 13. The turntable 12 defines a positioning portion 17 to restrain and support the clamping member 14. The center of the magnet 13 defines a first opening 131 and the center of the turntable 12 defines a second opening 121. The shaft 15 passes through the first opening 131 and the second opening 121 such that it protrudes through the turntable 12. The retaining washer 16 connects to the shaft 15 to restrain the magnet 13.

Figure 1B:
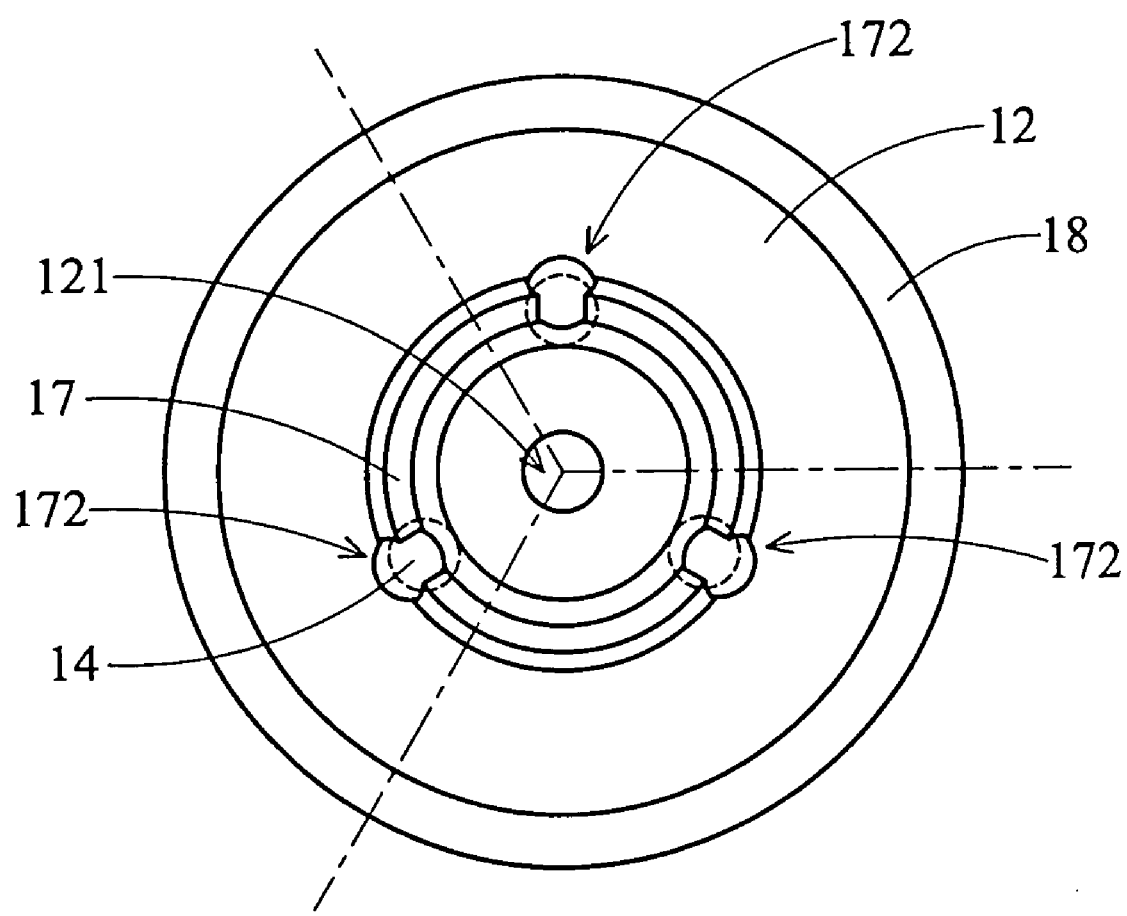
FIG. 1b is a top view of the optical disk clamping device in accordance with the present invention.

FIG. 1b shows a top view of the turntable 12. Three channels 172, 172, and 172 surround and define the positioning portion 17. The width of the channel 172 is smaller than the diameter of the clamping member 14 (the steel ball). Thus, the clamping member 14 is limited between the turntable 12 and the magnet 13, pushed outward along the channel 172, and partly protrudes beyond the channel 172. The position which the clamping member 14 is contained in channel 172, to support the magnet 13, is shown by the dashed lines in FIG. 1b, and the position which the clamping member 14 partly protrudes beyond the channel 172, to clamp the optical disk 1, is indicated by solid lines in FIG. 1b.

Figure 1C:
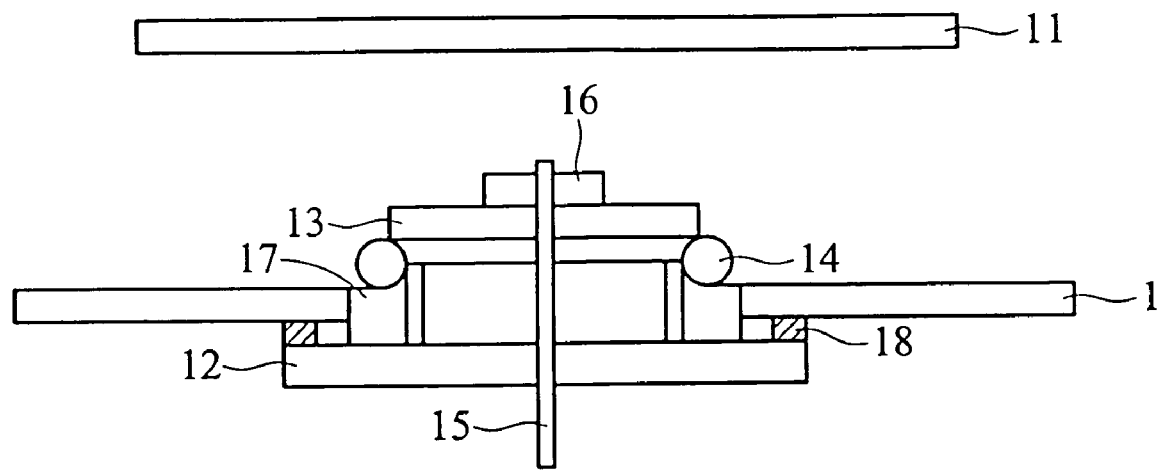
Figure 1D:
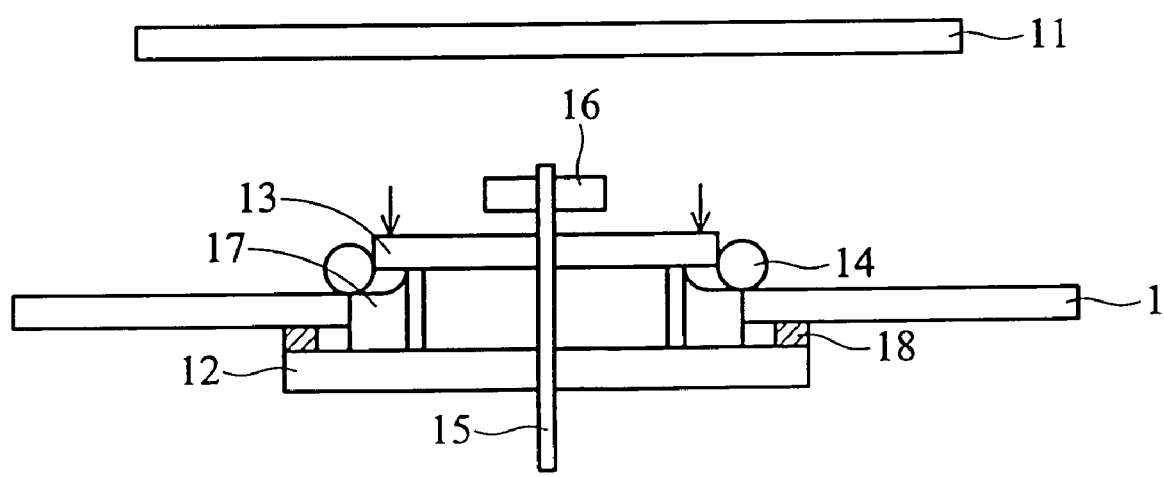

FIGS. 1c and 1d show the optical disk 1 loaded on the turntable 12. The clamping member 14 is attracted by the magnet 13 so that the clamping member 14 remains near the magnet 13. Thus, the optical disk 1 can be placed on the turntable 12 without applying force. At this point, the clamping member 14 is positioned in the channel 172 as mentioned above. Further, to prevent impact between the optical disk 1 and the turntable 12, a pad 18 is disposed on the periphery of the turntable 12 to support the optical disk 1. When the turntable 12 rotates, via the shaft 15, the magnet 13 rotates with the turntable 12. Thus, repellent force is generated between the magnet 13 and the diamagnetic member 11. The direction of the repellent force is shown by the arrow in FIG. 1d. The repellent force pushes the magnet 13 toward the clamping member 14. Then the clamping member 14 moves toward the channel 172 until it partially protrudes beyond the channel 172 so that the clamping member 14 fixes the optical disk 1. When the turntable 12 stops rotating, the repellent force between the magnet 13 and the diamagnetic member 11 ceases. Then the clamping member 14 is attracted by the magnet 13 so that the clamping force produced by the clamping member 14 on the optical disk 1 also ceases. Therefore, the optical disk 1 is easily unloaded without requiring the application of force.

In another example, the position of the diamagnetic member 11 and the magnet 13 can be exchanged, to achieve the same result.

Figure 2A:
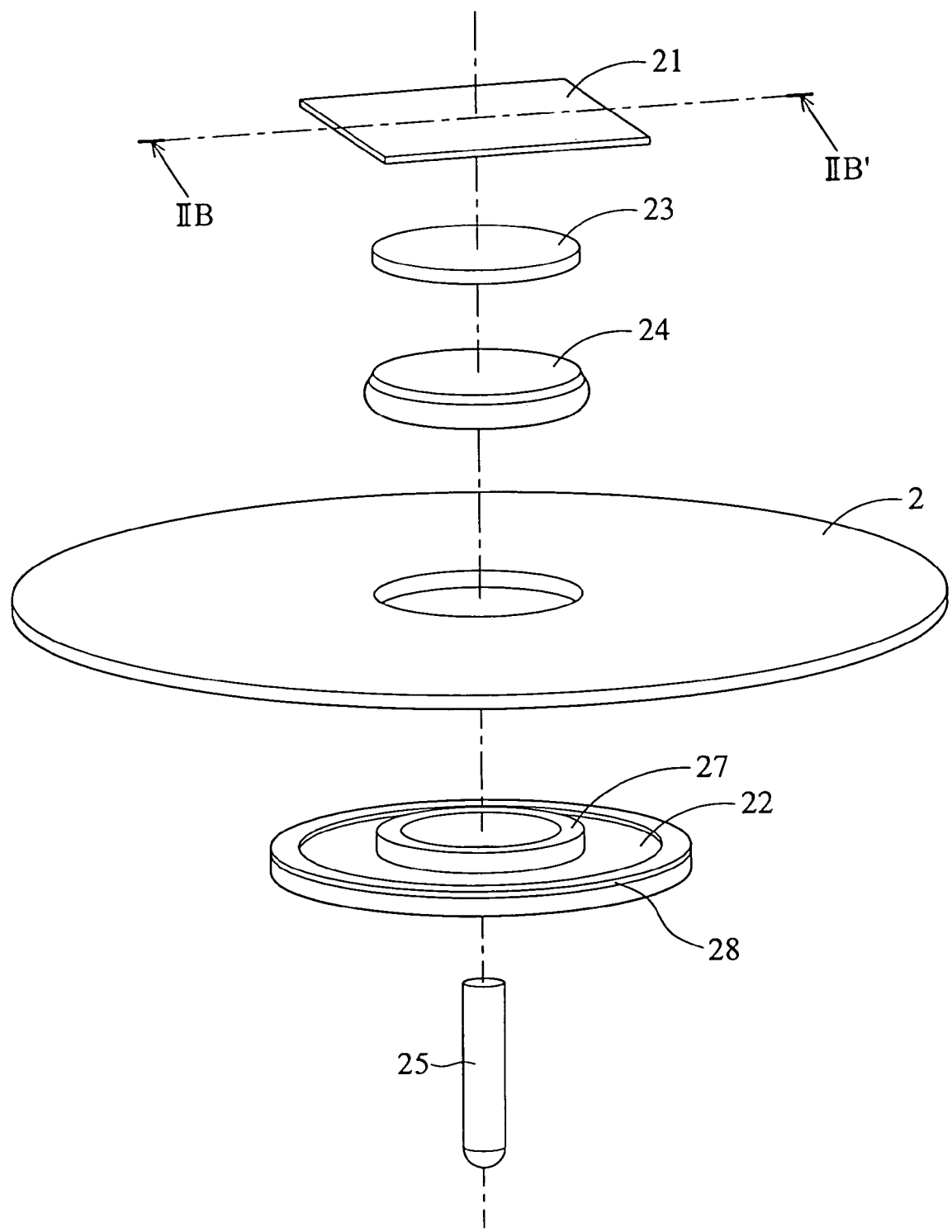
FIG. 2a is a schematic diagram of another form of an optical disk clamping device.
Figure 2B:
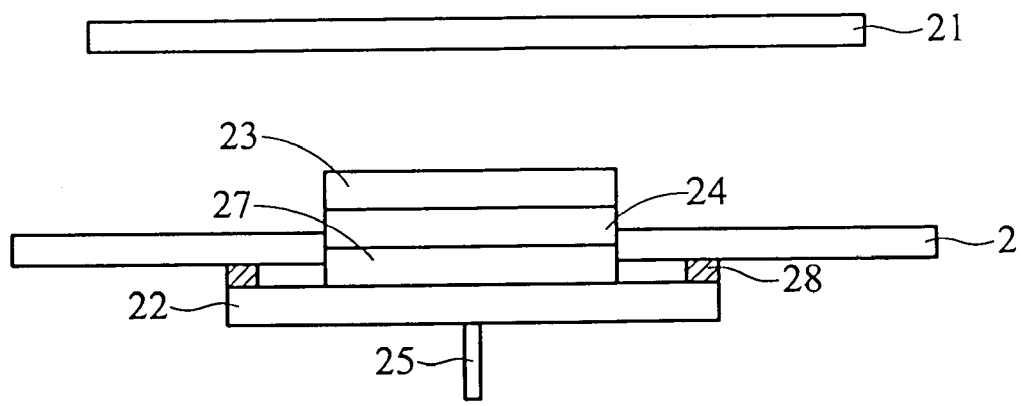
Figure 2C:
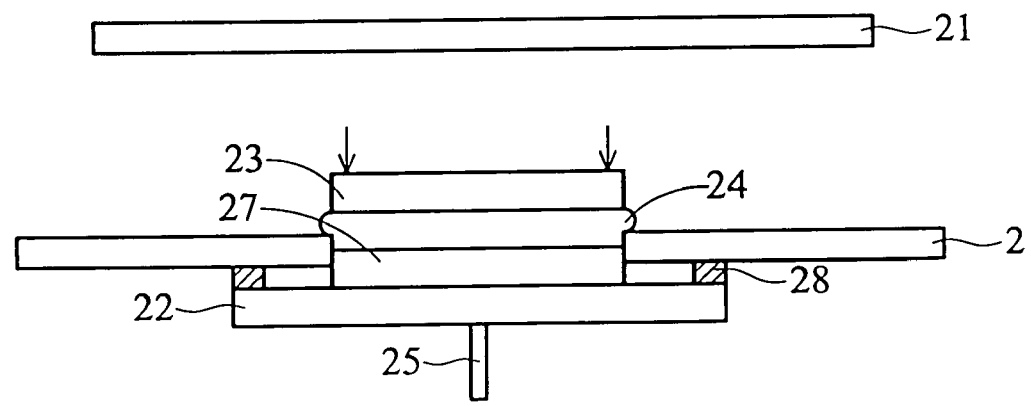

FIGS. 2a, 2b, and 2c show another type of optical disk clamping device including a diamagnetic member 21, a turntable 22, a magnet 23, a clamping member 24, and a shaft 25. In the embodiment, the diamagnetic member 21 is aluminum, for example, the diamagnetic member 21 is an aluminum cover of an optical disk drive, and the clamping member 24 is an elastic member such as rubber. The turntable 22 is disposed in the optical disk drive, and the shaft 25 is fastened to the turntable 22. The shaft 25 is rotated by a motor in the optical disk drive such that the turntable 22 rotates with the shaft 25.

The turntable 22 supports an optical disk 2. The magnet 23 is disposed between the diamagnetic member 21 and the turntable 22. The clamping member 24 is disposed on the turntable 22 to support the magnet 23. The turntable 22 defines a positioning portion 27 to restrain and support the clamping member 24. The shaft 25 fastens to the turntable 22 and an end of the shaft protrudes through the turntable 22. The magnet 23 and the clamping member 24 are glued to the positioning portion 27.

FIGS. 2b and 2c show the optical disk 2 putting on the turntable 22 without applying force. Moreover, to prevent the optical disk 2 from impacting the turntable 22, a pad 28 is disposed on the periphery of the turntable 22 to support the optical disk 2. When the turntable 22 rotates, the magnet 23 rotates with the turntable 22. Thus, repellent force is generated between the magnet 23 and the diamagnetic member 21. The direction of the repellent force is shown by the arrow in FIG. 2c. The repellent force makes the magnet 23 pushes toward the clamping member 24, and then the clamping member 24 is deformed to fix the optical disk 2. When the turntable 22 stops rotating, the repellent force between the magnet 23 and the diamagnetic member 21 ceases. The clamping member 24 then returns to the original form and the clamping force on the optical disk 2 also ceases. Therefore, the optical disk 2 is easily unloaded without requiring the application of force.

In another example, the position of the diamagnetic member 21 and the magnet 23 can be exchanged, and achieves the same result.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical disk clamping device, comprising:
   a magnetic member;
   a turntable supporting an optical disk;
   a magnet disposed between the magnetic member and the turntable; and
   a clamping member disposed on the turntable to support the magnet, wherein a repellent magnetic force is generated between the magnetic member and the magnet by rotating the turntable, the repellent magnetic force pushing the magnet toward the clamping member to fix the optical disk, and the repellent magnetic force ceases when the turntable stops rotating.

2. The optical disk clamping device as claimed in claim 1, wherein the turntable comprises a positioning portion for supporting the clamping member.

3. The optical disk clamping device as claimed in claim 2, wherein the positioning portion defines a channel and the clamping member is a steel ball, rotatably limited between the magnet and the channel, and the repellent force is generated between the magnetic member and the magnet when the turntable rotates, pushing part of the steel ball beyond the channel to fix the optical disk.

4. The optical disk clamping device as claimed in claim 3, wherein the width of the channel is smaller than the diameter of the steel ball such that the steel ball partly protrudes beyond the channel.

5. The optical disk clamping device as claimed in claim 1, further comprising a shaft and a retaining washer, wherein the shaft passes through the magnet and the turntable, and the retaining washer connects to the shaft to restrain the magnet.

6. The optical disk clamping device as claimed in claim 5, wherein the shaft defines a groove for seating the retaining washer.

7. The optical disk clamping device as claimed in claim 2, wherein the clamping member is an elastic member, and the repellent magnetic force is generated between the magnetic member and the magnet when the turntable rotates, deforming the elastic member to clamp the optical disk.

8. The optical disk clamping device as claimed in claim 1, wherein the magnetic member is an aluminum member.

9. The optical disk clamping device as claimed in claim 1, wherein the turntable further comprises a pad to support the optical disk.

10. An optical disk clamping device, comprising:
    a magnet;
    a turntable supporting an optical disk;
    a magnetic member disposed between the magnet and the turntable; and
    a clamping member disposed on the turntable to support the magnetic member, wherein repellent magnetic farce is generated between the magnetic member and the magnet by rotating the turntable, the repellent magnetic force pushing the magnetic member toward the clamping member to fix the optical disk, and the repellent magnetic force ceases when the turntable stops rotating.

11. The optical disk clamping device as claimed in claim 10, wherein the turntable comprises a positioning portion to support the clamping member.

12. The optical disk clamping device as claimed in claim 11, wherein the positioning portion defines a channel and the clamping member is a steel ball, rotatably limited between the magnetic member and the channel, and the repellent force is generated between the magnetic member and the magnet when the turntable rotates, pushing part of the steel ball beyond the channel to fix the optical disk.

13. The optical disk clamping device as claimed in claim 12, wherein the width of the channel is smaller than the diameter of the steel ball such that the steel ball partly protrudes beyond the channel.

14. The optical disk clamping device as claimed in claim 10, further comprising a shaft and a retaining washer, wherein the shaft passes through the magnetic member and the turntable, and the retaining washer connects to the shaft to restrain the magnetic member.

15. The optical disk clamping device as claimed in claim 14, wherein the shaft defines a groove seating the retaining washer.

16. The optical disk clamping device as claimed in claim 11, wherein the clamping member is an elastic member, and the repellent force is generated between the magnetic member and the magnet when the turntable rotates, deforming the elastic member to clamp the optical disk.

17. The optical disk clamping device as claimed in claim 10, wherein the magnetic member is an aluminum member.

18. The optical disk clamping device as claimed in claim 10, wherein the turntable further comprises a pad to support the optical disk.

19. The optical disk clamping device as claimed in claim 1, wherein the magnetic member comprises a material in which a repelling magnetic field is induced when the magnet is rotated relative to the magnetic member.

20. The optical disk clamping device as claimed in claim 19, wherein the magnetic member is diamagnetic.

21. The optical disk clamping device as claimed in claim 10, wherein the magnetic member comprises a material in which a repelling magnetic field is induced when the magnetic member is rotated relative to the magnet.

22. The optical disk clamping device as claimed in claim 21, wherein the magnetic member is diamagnetic.

* * * * *